3,701,798
SYNTHESIS OF UNSATURATED COMPOUNDS

Thomas Carter Snapp, Jr., Alden E. Blood, and Hugh John Hagemeyer, Jr., Longview, Tex., assignors to Eastman Kodak Company, Rochester, N.Y.
No Drawing. Original application Dec. 3, 1965, Ser. No. 511,327, now Patent No. 3,578,702. Divided and this application June 24, 1970, Ser. No. 59,836
Int. Cl. C07c *121/30, 49/20, 47/20*
U.S. Cl. 260—465.9                                     9 Claims

ABSTRACT OF THE DISCLOSURE

A process for producing $\alpha,\beta$-unsaturated aldehydes, ketones or nitriles which comprises contacting formaldehyde and a saturated aldehyde, ketone or nitrile at 300° to 525° C. in the presence of at least one inorganic oxide of a rare earth metal of the lanthanide series impregnated on a silica gel, alumina or kieselguhr support.

---

This invention relates to the synthesis of $\alpha,\beta$-unsaturated esters, aldehydes, ketones, and nitriles and more particularly to the synthesis of such compounds by vapor phase reaction of saturated esters, aldehydes, ketones, and nitriles with formaldehyde over a solid catalyst.

This is a division of U.S. application Ser. No. 511,327, filed Dec. 3, 1965 now U.S. Pat. 3,578,702.

The condensation of saturated aliphatic esters, aldehydes, ketones, and nitriles with formaldehyde in the vapor phase to result in the formation of unsaturated compounds has been disclosed in the literature. The catalysts heretofore employed in these vapor phase condensations are basic metal compounds supported on a carrier such as silica or alumina. Specific basic metal compounds disclosed in the literature include: salts or oxides of alkali metals, lead, zinc, chromium, or manganese. The disadvantages of these prior art catalysts are low conversions and yields, extensive by-product formation, and short catalyst life. These disadvantages frequently make the use of these catalysts economically unattractive.

It is, therefore, the principal object of this invention to provide a process for the manufacture of $\alpha,\beta$-unsaturated aliphatic esters, aldehydes, ketones, and nitriles by a vapor phase reaction of saturated aliphatic esters, aldehydes, ketones, and nitriles with formaldehyde in the presence of a catalyst which results in higher yields and conversion, lower by-product formation, and significantly longer catalyst life than had heretofore been obtained with known catalysts.

Other objects will become apparent from the following description and claims.

In accordance with the present invention, $\alpha,\beta$-ethylenically unsaturated esters, aldehydes, ketones, and nitriles are prepared by a process which comprises passing a gaseous mixture of formaldehyde and a compound having the generic formula $RCH_2X$ or $XCH_2R'CH_2X$ in which R is hydrogen or an aliphatic hydrocarbon radical, R' a bond or a divalent aliphatic hydrocarbon radical and X is a functional group having the formula

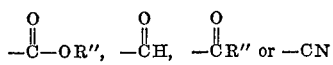

R" being a hydrocarbon or substituted hydrocarbon radical, at a temperature of 300° to 525° C. over a supported rare earth metal oxide catalyst and recovering a compound having the formula

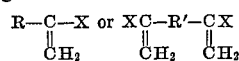

where R, R' and X have the indicated meaning.

The esters, aldehydes, ketones, and nitriles employed in the vapor phase condensation of the present invention include those which have heretofore been employed in vapor phase condensation with formaldehyde to give $\alpha,\beta$-ethylenically unsaturated esters, aldehydes, ketones, and nitriles. The principal requirement of a suitable starting material is that the carbon atom adjacent to the functional group, i.e. the $\alpha$-carbon atom, contain at least two hydrogen atoms. It will further be apparent that the particular material employed should also be substantially stable at the reaction temperature. The thermal stability of any starting material is either known or can be readily established experimentally. In general, it is preferred to react the difunctional compounds at the lower end of the temperature range cited since at the high end of the temperature range decomposition can adversely affect the yields and conversion. The aliphatic hydrocarbon radicals R and R' can be saturated or unsaturated and generally have from 1 to 20 carbon atoms. At higher numbers of carbon atoms, vaporization of such esters, aldehyde, ketones, and nitriles may become difficult. The R" radical can be alkyl, aryl, alkaryl, aralkyl, cycloalkyl, alkenyl and can also be substituted with functional groups. Such functional substituents include ether groups, halogen, and groups of the type described above which do not have the necessary $\alpha$-carbon atom. The preferred starting materials are, however, those in which R is hydrogen or a lower alkyl group, i.e., containing from 1 to 6 carbon atoms, R' a bond or a lower alkylene group and R" a lower alkyl group. Specific examples of starting materials include methyl acetate, ethyl acetate, propyl acetate, methyl propionate, ethyl butyrate, methyl hexanoate, ethyl heptanoate, acetaldehyde, butyraldehyde, propionaldehyde, valeraldehyde, acetone, methyl ethyl ketone, 2-pentanone, 3-pentanone, 4-heptanone, methyl isobutyl ketone, methyl n-amyl ketone, acetonitrile, propionitrile, butyronitrile, hexane nitrile, heptane nitrile, acetonyl acetone, acetyl acetone, benzal acetone, acetophenone, dimethyl adipate, adiponitrile, and the like. The described starting material need not be pure in order to be suitable in the process of the present invention and esters, aldehydes, ketones, and nitriles obtained by normal distillation procedures can be employed. The formaldehyde employed to react with the described saturated compounds can be derived from any commercial source of formaldehyde such as aqueous, alcoholic, or polymeric formaldehyde.

The catalysts giving rise to the surprisingly improved results, which can be achieved by the vapor condensation of the present invention are supported rare earth metal oxides in which the support can be any inert material heretofore employed as catalyst support such as alumina or kieselguhr but is preferably silica gel. The rare earth metal oxides employed are the oxides of metals of the lanthanide series having atomic numbers from 57 to 71 inclusive and include the oxides of lanthanum, cerium, praseodymium, neodymium, promethium, samarium, europium, gadalinium, terbium, dysprosium, holmium orbium, thuliam, ytterbium, and lutetium. The oxides can be employed individually or mixtures of such oxides can be employed. The oxide is deposited on the support such that the concentration of the oxide is from 0.5 to 10 percent by weight of the supported catalyst. This concentration range, however, constitutes merely a preferred range and both higher and lower concentrations of rare earth metal oxides will give rise to the unsaturated product. The rare earth metal oxides are deposited on the support employing rare earth metal salt solutions, evaporating the solvent and then oxidizing the salt to the desired oxide. The oxidation can be carried out in a separate prior step or the metal oxide can be formed in situ in the reaction zone. The preferred catalysts of this invention are lanthanum oxide on silica gel and cerium oxide on silica gel.

The synthesis of the ethylenically unsaturated esters, aldehydes, ketones, and nitriles using the rare earth metal oxide supported catalyts is carried out by means heretofore employed in the formation of such unsaturated compounds by vapor phase condensation with formaldehyde. Thus, the reagents can be separately fed to the reaction zone and mixed at the site of the reaction or can be premixed and preheated before entering the reaction zone. The reaction can be carried out on a continuous or batch basis although continuous operation is preferred. The reaction zone can be a fixed bed or moving bed reaction tower of the type well-known in the art. The reaction product is condensed and subsequently distilled for purification purposes. The molar ratio of the ester, aldehyde, ketone, or nitrile to formaldehyde is not critical but is generally maintained within the range of 1:1 to 25:1 in order to assure optimum conversion and yields. Optimum ratios will vary depending on the reaction conditions and reagents but can be readily established experimentally. The reaction proceeds smoothly at temperatures of 300°–525° C. and preferably temperatures of 425°–500° C. are employed with the preferred starting materials. It is, however, not intended to limit the process of the present invention to these temperature ranges since operable conditions outside the stated temperature ranges are feasible if the reagent can be maintained in the vapor phase. Pressure has no substantial effect on the ability of the rare earth metal oxides to catalyze the described reaction and thus subatmospheric, atmospheric and superatmospheric pressures can be employed. Optimum pressures will vary with the type of equipment, and the nature of the reagents involved. In the examples below specifically illustrating the present invention, a reaction system comprising a calibrated reservoir, metering pump, preheater, catalyst tube, and condenser was utilized. The reaction product was purified by fractional distillation under reduced pressure.

The reaction time required to achieve maximum conversions and yields in continuous operation is generally short, e.g., less than 10 seconds, but will vary with the reagents, catalysts, ratio of reagents to catalysts, and reaction temperatures employed. Optimum contact times for each individual reaction system are, however, readily established experimentally.

The process of the present invention not only provides higher conversions and yields with less by-product formation than is obtained by similar processes heretofore described in the art, but in addition, employs a catalyst system which has a life span of more than one hundred times the useful life of catalysts heretofore employed in this reaction.

The process of the present invention is further illustrated by the following examples in which all units of quantity are by weight unless otherwise indicated. In these examples, Examples 1 and 2 illustrate the methods of forming the catalysts employed in the process of the present invention and Examples 6, 7, and 8, show comparative results obtained with catalysts heretofore developed for this reaction.

EXAMPLE 1

A solution of 13.3 grams of purified lanthanum nitrate hexahydrate and 250 ml. of water was prepared. This solution was poured on 100 grams of 10-mesh silica gel particles with vigorous stirring. The resulting mass was allowed to stand 24 hours, after which the water was evaporated by heating. The residue was treated at 450° C. in a force draft air oven for 16 hours. The fines were screened from the resulting product and discarded. The catalyst obtained was a 5 weight percent lanthanum oxide on silica gel.

EXAMPLE 2

Cerium oxide-on-silica gel catalyst was prepared by dissolving 7.05 grams of cerium sulfate tetrahydrate in 200 ml. of water. The solution was mixed with 100 grams of 10-mesh silica gel with vigorous stirring. After 3 days, the resulting mass was heated to remove water. The residue was heated at 500° C. for 16 hours in a force draft air oven. The fines were screened from the product and discarded. The catalyst obtained was a 3 weight percent cerium oxide on silica gel.

EXAMPLE 3

A gaseous mixture of acetone and methanolic formaldehyde was passed through a catalyst bed at atmospheric pressure, at a temperature of 480° to 490° C., and a contact time of 3 seconds over the catalyst which was a 5 weight percent lanthanum oxide on silica gel. The mole ratio of the ketone to formaldehyde was 3:1, respectively. Conversion to methyl vinyl ketone based on formaldehyde was 40 percent and the yield, 91 percent.

EXAMPLE 4

A gaseous mixture of methyl acetate and methanolic formaldehyde was passed through a catalyst bed at atmospheric pressure, at a temperature of 485° to 495° C., and a contact time of 3 seconds over the catalyst. The formaldehyde used was a commercial methanolic solution. The catalyst was a 5 weight percent lanthanum oxide on silica gel. The mole ratio of methyl acetate to formaldehyde was 3:1. Conversion to methyl acrylate based on formaldehyde was 25 percent and the yield, 88 percent.

EXAMPLE 5

A gaseous mixture of methyl acetate and formaldehyde was passed through a catalyst bed at atmospheric pressure, at a temperature of 480°–490° C., and a contact time of 4 seconds over the catalyst. The formaldehyde used was a commercial methanolic solution. The catalyst was a 3 weight percent cerium oxide on silica gel. The mole ratio of methyl acetate to formaldehyde was 3:1. Conversion to methyl acrylate based on formaldehyde was 15 percent and the yield, 85 percent.

EXAMPLE 6

A gaseous mixture of methyl acetate and methanolic formaldehyde was passed through a catalyst bed consisting of a basic metal compound impregnated on silica gel at atmospheric pressure at temperatures of 360°–375° C. The formaldehyde used was a commercial solution containing 46.5 percent formaldehyde, 44.5 percent methanol, and 9 percent water. The mole ratio of methyl acetate to formaldehyde, and the amount of potassium hydroxide in the catalyst in each run, are shown in Table I below. The percentage conversion and yields to methyl acrylate are based on formaldehyde.

TABLE I

| Percent KOH on $SiO_2$ gel | Ester:$CH_2O$ mole ratio | Percent conversion | Percent yield |
|---|---|---|---|
| 3 | 5:2 | 6 | 15 |
| 3 | 5:1 | 10 | 20 |
| 10 | 5:1 | 5 | 12 |

EXAMPLE 7

A gaseous mixture of methyl propionate and trioxane was passed through a catalyst bed consisting of a basic metal compound impregnated on silica gel at atmospheric pressures at temperatures of 360°–375° C. The mole ratio of methyl propionate to formaldehyde, and the amount of potassium hydroxide on the catalyst in each run, are shown in Table II below. The percent conversions and yields to methyl methacrylate are based on formaldehyde.

TABLE II

| Percent KOH on $SiO_2$ gel | Ester:$CH_2O$ mole ratio | Percent conversion | Percent yield |
|---|---|---|---|
| 3 | 5:1 | 8 | 14 |
| 10 | 5:1 | 3 | 6 |
| 3 | 10:1 | 14 | 26 |
| 1 | 10:1 | 6 | 19 |

EXAMPLE 8

A gaseous mixture of acetone and methanolic formaldehyde was passed through a catalyst bed consisting of a basic metal compound impregnated on silica gel at atmospheric pressures at temperatures of 360°–375° C. The formaldehyde used was a commercial solution containing 46.5 percent formaldehyde, 44.5 percent methanol, and 9 percent water. The mole ratio of acetone to formaldehyde, and the amount of potassium hydroxide in the catalyst in each run, are shown in Table III below. The percentage conversion and yield to methyl vinyl ketone are based on formaldehyde.

TABLE III

| Percent KOH on SiO$_2$ gel | Acetone:CH$_2$O mole ratio | Percent conversion | Percent yield |
|---|---|---|---|
| 3 | 5:1 | 16 | 31 |
| 3 | 3:1 | 13 | 26 |
| 10 | 3:1 | 10 | 10 |

EXAMPLE 9

The same procedure as in Example 5 was followed, excepting a gaseous mixture of methyl propionate and formaldehyde was used instead of the methyl acetate and formaldehyde of Example 5. Substantially the same results were obtained.

EXAMPLE 10

A gaseous mixture of an aldehyde or nitrile and methanolic formaldehyde was passed through a catalyst bed at atmospheric pressure, at a temperature of 475°–500° C. The formaldehyde used was a commercial methanolic solution containing 46.5 percent formaldehyde, 44.5 percent methanol, and 9.0 percent water. The catalyst was a 3 weight percent lanthanum oxide-on-silica gel catalyst. The various aldehydes and nitriles reacted with the formaldehyde are shown below in Table IV and V, respectively. A 3:1 mole ratio of aldehyde or nitrile to formaldehyde was utilized in these condensations. Conversions and yields to the α,β-unsaturated product are based on formaldehyde.

TABLE IV

| Aldehyde | Percent conversion | Percent yield |
|---|---|---|
| CH$_3$CHO | 38 | 86 |
| CH$_3$CH$_2$—CHO | 45 | 92 |
| CH$_3$CH$_2$CH$_2$—CHO | 34 | 89 |

TABLE V

| Nitrile | Percent conversion | Percent yield |
|---|---|---|
| CH$_3$—CN | 15 | 22 |
| CH$_3$CH$_2$—CN | 36 | 91 |
| CH$_3$CH$_2$CH$_2$—CN | 29 | 84 |

The foregoing examples illustrate the formation of the catalyst employed in the process of the present invention, the formation of ethylenically unsaturated esters, aldehydes, ketones, and nitriles by the process of the present invention and further illustrate the superior results obtained with the rare earth metal oxide catalyst as compared to the basic metal catalysts of the art. It will be apparent that other starting compounds falling within the scope of the invention but not specifically illustrated in the examples can be employed in the procedures illustrated in the examples. Other techniques of conducting the reaction employing the rare earth metal oxide catalysts will be apparent and are intended to be included within the scope of the present invention. The products obtained by the process of the present invention have utility as intermediates such as for example, as monomers in the preparation of addition polymers useful as plastics.

What is claimed is:
1. A process for the preparation of α,β-unsaturated compounds having the generic formula

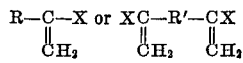

wherein R, R' and X are as defined below, which comprises passing a mixture of formaldehyde and a compound having the generic formula RCH$_2$X or

XCH$_2$R'CH$_2$X in which R is hydrogen, or a saturated aliphatic hydrocarbon radical having 1 to 20 carbon atoms, R' is a carbon-carbon bond or a divalent saturated aliphatic hydrocarbon radical having 1 to 20 carbon atoms and X is a functional group having the formula

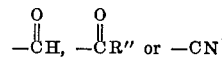

wherein R" is a lower alkyl radical at a temperature of 300° to 525°C. over a catalyst consisting essentially of one or more inorganic oxides of rare earth metals of the lanthanide series impregnated on a silica gel, alumina or kieselguhr support.

2. The process of claim 1 wherein the compound has the general formula RCH$_2$X.

3. The process of claim 1 wherein the mixture is passed over the catalyst at a temperature of 300°–525° C. and the ratio of formaldehyde to the compound having the general formula RCH$_2$X is 1:1 to 25:1.

4. The process of claim 2 wherein R is hydrogen and R" a lower alkyl radical.

5. The process of claim 2 wherein R and R" are lower alkyl radicals.

6. The process of claim 1 wherein the supported rare earth metal oxide catalyst is a lanthanum oxide on silica gel or a cerium oxide on silica gel containing from 0.5 to 10 weight percent on the rare earth metal oxide.

7. The process of claim 2 wherein the compound RCH$_2$X is acetonitrile, propionitrile or n-butyronitrile.

8. The process of claim 2 wherein the compound RCH$_2$X is acetone or methyl ethyl ketone.

9. The process of claim 2 wherein the compound RCH$_2$X is acetaldehyde, propionaldehyde, or butyraldehyde.

References Cited

UNITED STATES PATENTS

| | | | |
|---|---|---|---|
| 3,060,236 | 10/1962 | Kollar et al. | 260—590 |
| 2,212,506 | 8/1940 | Bachman et al. | 260—485 |
| 2,734,074 | 2/1956 | Redmon | 260—486 |
| 3,089,898 | 5/1963 | Vitcha et al. | 260—486 |
| 3,089,899 | 5/1963 | Vitcha et al. | 260—486 |
| 3,089,900 | 5/1963 | Vitcha et al. | 260—486 |
| 3,089,901 | 5/1963 | Vitcha et al. | 260—486 |
| 3,089,902 | 5/1963 | Vitcha et al. | 260—486 |
| 3,100,795 | 8/1963 | Frantz et al. | 260—486 |
| 3,414,588 | 12/1968 | Jones | 260—340.7 |
| 2,245,582 | 6/1941 | Gallagher et al. | 260—601 |

JOSEPH P. BRUST, Primary Examiner

U.S. Cl. X.R.

260—465.8 R, 590, 593 R, 601 R